US010514855B2

(12) United States Patent
Voigt

(10) Patent No.: US 10,514,855 B2
(45) Date of Patent: Dec. 24, 2019

(54) NVRAM PATH SELECTION

(71) Applicant: Hewlett Packard Enterprise Development LP, Houston, TX (US)

(72) Inventor: Douglas L Voigt, Boise, ID (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 446 days.

(21) Appl. No.: 14/433,671

(22) PCT Filed: Dec. 19, 2012

(86) PCT No.: PCT/US2012/070585
§ 371 (c)(1),
(2) Date: Apr. 5, 2015

(87) PCT Pub. No.: WO2014/098839
PCT Pub. Date: Jun. 26, 2014

(65) Prior Publication Data
US 2015/0317095 A1 Nov. 5, 2015

(51) Int. Cl.
G06F 15/16 (2006.01)
G06F 3/06 (2006.01)
H04L 29/08 (2006.01)
G06F 13/16 (2006.01)
G06F 11/14 (2006.01)

(52) U.S. Cl.
CPC ............ G06F 3/0635 (2013.01); G06F 3/061 (2013.01); G06F 3/0683 (2013.01); G06F 13/1642 (2013.01); H04L 67/1097 (2013.01); G06F 11/1423 (2013.01)

(58) Field of Classification Search
CPC ...... G06F 3/0635; G06F 3/061; G06F 3/0683; G06F 13/1642; G06F 11/1423; H04L 67/1097
USPC .................... 709/219; 711/6, 100, 104, 112
See application file for complete search history.

(56) References Cited

U.S. PATENT DOCUMENTS

| 5,179,675 A * | 1/1993 | Cole ................ G06F 12/0831 711/3 |
| 6,243,795 B1 * | 6/2001 | Yang ................ G06F 11/1666 160/113 |
| 6,496,906 B1 * | 12/2002 | Novak ............... G06F 13/1642 365/203 |
| 6,647,016 B1 * | 11/2003 | Isoda ................ G06F 13/122 370/412 |
| 6,785,767 B2 * | 8/2004 | Coulson ............ G06F 3/0613 711/103 |

(Continued)

FOREIGN PATENT DOCUMENTS

| CN | 1534487 A | * 10/2004 | ......... G06F 12/0835 |
| CN | 1534487 A | * 10/2004 | ......... G06F 12/0835 |

(Continued)

OTHER PUBLICATIONS

US 7,278,054 B2, 10/2007, Pecone et al. (withdrawn)

(Continued)

Primary Examiner — John B Walsh
(74) Attorney, Agent, or Firm — Trop, Pruner & Hu, P.C.

(57) ABSTRACT

A memory access request including an address is received from a memory controller of an application server. One of a plurality of paths to the NVRAM is selected based on the address from the memory access request.

20 Claims, 5 Drawing Sheets

(56) References Cited

U.S. PATENT DOCUMENTS

| | | | |
|---|---|---|---|
| 6,944,730 B2* | 9/2005 | Lai | G06F 13/161 711/154 |
| 6,944,742 B1* | 9/2005 | Shoff | G06F 3/0608 711/170 |
| 7,143,219 B1* | 11/2006 | Chaudhari | G06F 13/364 710/111 |
| 7,783,788 B1 | 8/2010 | Quinn et al. | |
| 7,873,797 B2* | 1/2011 | Niggemeier | G06F 13/18 711/105 |
| 8,020,035 B2* | 9/2011 | Voigt | G06F 11/201 710/313 |
| 8,041,884 B2* | 10/2011 | Chang | G11C 16/10 365/185.33 |
| 8,432,754 B2* | 4/2013 | Iwasaki | G11C 8/18 365/189.06 |
| 8,531,880 B2* | 9/2013 | Rao | G11C 16/10 365/185.08 |
| 8,898,417 B1 | 11/2014 | Post et al. | |
| 9,405,711 B2* | 8/2016 | Fleischer | G06F 13/1663 |
| 9,529,708 B2* | 12/2016 | Puthiyedath | G06F 12/08 |
| 2002/0091903 A1* | 7/2002 | Mizuno | G06F 3/0605 711/154 |
| 2004/0199727 A1* | 10/2004 | Narad | G06F 12/0835 711/138 |
| 2008/0209114 A1* | 8/2008 | Chow | G06F 12/0804 711/103 |
| 2008/0276032 A1* | 11/2008 | Iida | G06F 3/0619 710/316 |
| 2009/0034349 A1* | 2/2009 | Miura | G11C 5/063 365/189.17 |
| 2010/0011162 A1* | 1/2010 | Wang | G06F 3/0607 711/114 |
| 2010/0017496 A1* | 1/2010 | Kimmel | G06F 12/0868 709/212 |
| 2010/0030981 A1* | 2/2010 | Cook | G06F 12/0866 711/159 |
| 2010/0287391 A1* | 11/2010 | Ochiai | G06F 1/3203 713/320 |
| 2011/0047356 A2* | 2/2011 | Flynn | G06F 3/0613 712/220 |
| 2011/0208905 A1* | 8/2011 | Shaeffer | G11C 16/10 711/103 |
| 2012/0072807 A1* | 3/2012 | Cornwell | G06F 11/0742 714/773 |
| 2012/0131413 A1* | 5/2012 | Thatcher | G06F 11/073 714/758 |
| 2012/0221767 A1* | 8/2012 | Post | G06F 13/1673 711/103 |
| 2012/0226850 A1* | 9/2012 | Nakanishi | G06F 12/1009 711/102 |
| 2012/0278528 A1* | 11/2012 | Galbraith | G06F 12/0804 711/103 |
| 2012/0278651 A1* | 11/2012 | Muralimanohar | G06F 11/20 714/6.11 |
| 2013/0042052 A1* | 2/2013 | Colgrove | G06F 3/0608 711/103 |
| 2013/0080726 A1* | 3/2013 | Kegel | G06F 12/1081 711/163 |
| 2013/0091321 A1* | 4/2013 | Nishtala | G06F 12/08 711/103 |
| 2013/0138872 A1* | 5/2013 | Karamcheti | G06F 13/1657 711/103 |
| 2013/0262958 A1* | 10/2013 | Ruggiero | G06F 11/10 714/763 |
| 2013/0275661 A1* | 10/2013 | Zimmer | G06F 12/0246 711/103 |
| 2013/0275682 A1* | 10/2013 | Ramanujan | G06F 13/1684 711/122 |
| 2013/0339572 A1* | 12/2013 | Fanning | G06F 12/1009 711/102 |
| 2015/0288752 A1 | 10/2015 | Voigt | |

FOREIGN PATENT DOCUMENTS

| | | |
|---|---|---|
| JP | 2006164099 A | 6/2006 |
| TW | 200825751 A | 6/2008 |
| TW | 200903249 A | 1/2009 |

OTHER PUBLICATIONS

International Search Report and Written Opinion received in PCT Application No. PCT/US2012/070585, dated Sep. 13, 2013, 13 pgs.

Moraru, I. et al, Persistent, Protected and Cached: Building Blocks for Main Memory Data Stores, (Research Paper), Dec. 2011, 24 pp. http://www.pdl.cmu.edu/PDL-FTP/NVM/CMU-PDL-11-114.pdf.

Oracle Optimized Solution for Weblogic Suite: an Optimal In-memory Data Grid Architecture, (Research Paper), Mar. 2011, 33p. http://www.oracle.com/technetwork/articles/systems-hardware-architecture/oo-soin-weblogic-11g-170238.pdf.

Extended European Search Report received in EP Application No. 12890441.4, dated Sep. 9, 2016, 7 pages.

IBM Corporation, "Raid with NVRAM for Parity and/or Data," IBM Technical Disclosure Bulletin, vol. 28 No. 06, Jun. 1995, pp. 545-547.

* cited by examiner

NVRAM PATH SELECTION

CROSS-REFERENCE TO RELATED APPLICATION

This application is a national stage application under 35 U.S.C. § 371 of PCT/US2012/070585, filed Dec. 19, 2012.

BACKGROUND

Due to recent innovations in solid state storage technology, such technology is being integrated into memory systems. Servers connected to the memory systems may seek to write data to or read data from the solid state storage technology. System vendors may be challenged to integrate such technology into systems to provide lower latency while still maintaining adequate fault domain isolation and ease of implementation.

BRIEF DESCRIPTION OF THE DRAWINGS

The following detailed description references the drawings, wherein.

DETAILED DESCRIPTION

Figure 1:
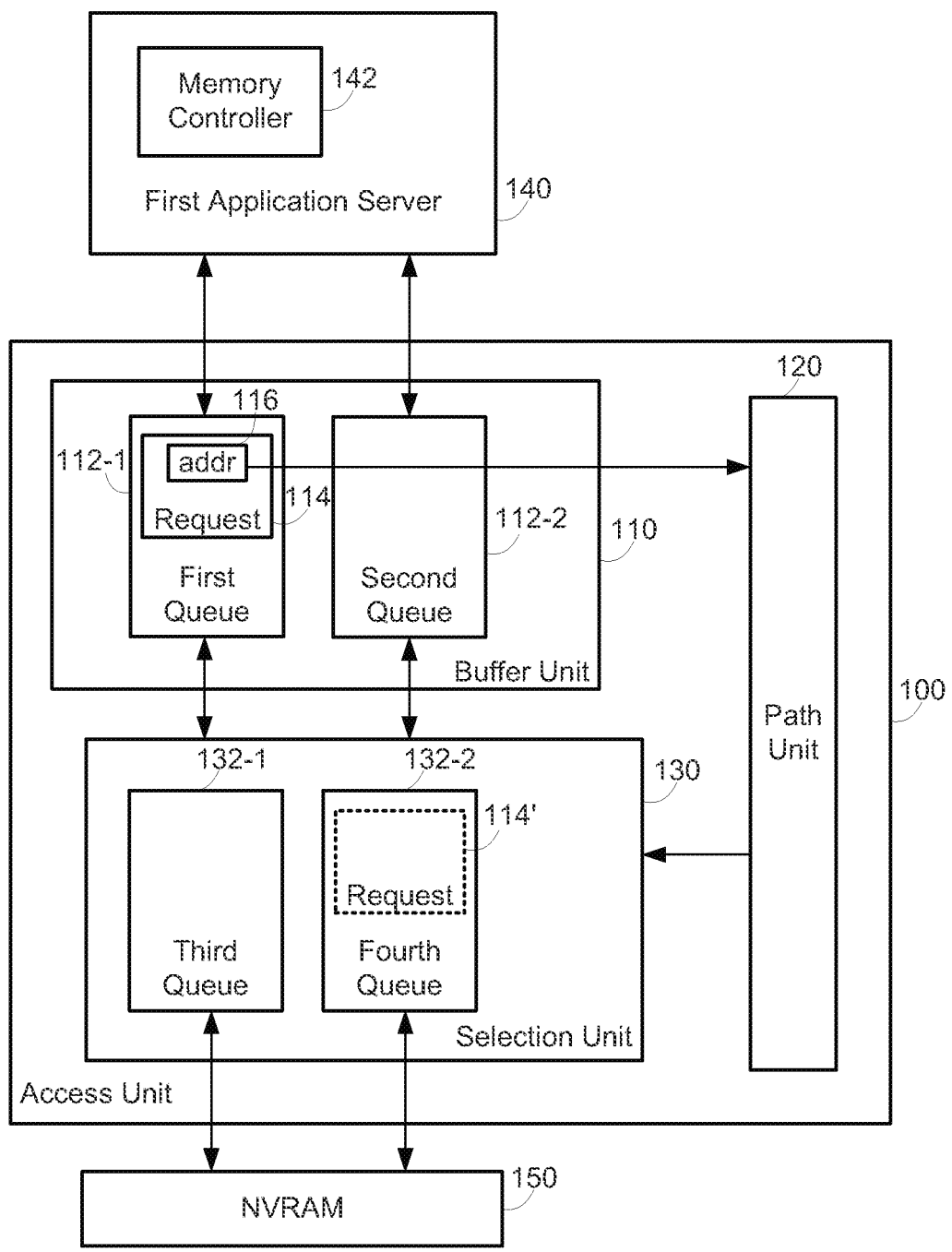
FIG. 1 is an example block diagram of an access unit interfacing with an NVRAM and a first application server.

Specific details are given in the following description to provide a thorough understanding of embodiments. However, it will be understood that embodiments may be practiced without these specific details. For example, systems may be shown in block diagrams in order not to obscure embodiments in unnecessary detail. In other instances, well-known processes, structures and techniques may be shown without unnecessary detail in order to avoid obscuring embodiments.

Recent innovation in solid state storage technology such as nonvolatile random access memory (NVRAM) like Memristor, Spin Torque and Phase Change memory, may provide an ability for a processor to submit memory access requests to an external storage device for operations such as write/store and read/load operations. Adding solid state storage technology may place a new hierarchy layer above current storage hierarchies. New data flow architectures may be needed to seamlessly integrate this new layer into storage hierarchies while retaining properties such as storage resource sharing, high availability and fully autonomic operation.

Some solutions include solid state storage technology being integrated directly into server components such as PCI cards or memory. However, such solutions may not exhibit a fault domain isolation necessary to assure levels of high availability associated with current disk arrays. Some solutions distribute copies or erasure coded data groupings across server nodes. However, this solution does not support a rapid response time associated with solid state storage technology. Further, large high end memory systems can be extended across servers or server blades, and redundant array of independent disks (RAID) and other fault tolerance algorithms may be applied within those systems. These systems may not enable the ease of use of a turnkey hierarchical storage appliance.

Examples of the present application may allow a path from an application server to NVRAM to be selected at memory access speeds. Further, if the selected path fails, an alternate path may also be selected at memory access speeds and without requiring the application server to retry accessing the NVRAM. For example, a memory access request including an address may be received by an access unit from a memory controller of an application server. One of a plurality of paths to the NVRAM may be selected by the access unit based on the address from the memory access request.

In some examples, as the application server may be redundantly connected to the access unit and the access unit may be redundantly connected to the NVRAM, an adequate level of network fault tolerance may be achieved. By including the controller in the control flow of the NVRAM, such as in map, unmap and sync commands, the controller may provide features like RAID, remote replication, point in time copy, thin provisioning and cache/tier management.

Some examples of the present application may assure low latency communication between the application server and NVRAM, while still isolating server connectivity from storage hierarchy connectivity to assure adequate fault tolerance. Also, the access unit may be enabled to pursue autonomic, fault tolerant storage hierarchy operations and rich data services. Moreover, fault isolation between the application server and access unit may be assured and configuration changes may be communicated in such a way that it may reduce the risk of exposure of the NVRAM to data corruption or attack during a change. Fault isolation may refer to having a capability to identify a time, location and/or type of fault that has occurred within the system. Fault tolerance may refer to having a capability to continue operation, possibly at a reduced level, rather than failing completely, when a part of the system fails.

Referring now to the drawings, FIG. 1 is an example block diagram of an access unit 100 interfacing with an NVRAM 150 and a first application server 140. The access unit 100 may be any type of device involved in controlling access to a memory, such as the NVRAM 150 or a block storage device. In the embodiment of FIG. 1, the access unit 100 includes a buffer unit 110, a path unit 120 and a selection unit 130. The NVRAM 150 may include any type of random-access memory that retains its information when power is turned off, such as Memristor-based, Spin-Torque transfer, and Phase Change memory. The first application server 140 may refer to any type of device that seeks to access the NVRAM 150, such as a main processor of a computer or a computer connected to a computer network. For example, the first application server 140 may host applications and present a memory address table for use by the applications that includes an address space of the NVRAM 150, such as via implementation of a memory mapped storage system, as explained below.

The memory access request 114 may relate to a read or write request transmitted by a memory controller 142 of the first application server 140. The memory controller 142 may be any type of device that manages a flow of data going to and from a main memory and may include logic and/or circuitry for interpreting a request from a central processing unit (CPU) in order to locate data locations and/or addresses, in memory.

For example, the memory controller 142 may interface between a system memory (not shown), such as virtual memory, and a CPU (not shown) of the first application server 140. Machine code related to reading or writing may be executed by the CPU of the first application server 140, causing the CPU to access the system memory of the first application server 140 to read or write data for a given address. The system memory may virtualize various forms of computer data storage (such as internal memory of the first application server 140 and external memory like the NVRAM 150 and/or disk storage) into a single table. Thus, the memory controller 142 may find that an address of the system memory is mapped to the NVRAM 150, which may in turn lead the memory controller 142 to submit the memory access request 114 to the access unit 100.

The first application server 130 and the access unit 100 may include, for example, a hardware device including electronic circuitry for implementing the functionality described below, such as control logic and/or memory. In addition or as an alternative, the first application server 140 and the access unit 100 may be implemented as a series of instructions encoded on a machine-readable storage medium and executable by a processor. Similarly, the buffer, selection and path units 110, 120 and 130 of the access unit 100 may include, for example, a hardware device including electronic circuitry for implementing the functionality described below, such as control logic and/or memory. In addition or as an alternative, the buffer, selection and path units 110, 120 and 130 of the access unit 100 may be implemented as a series of instructions encoded on a machine-readable storage medium and executable by a processor The buffer unit 110 of the access unit 100 includes first and second queues 112-1 and 112-2 to receive a memory access request 114 from a memory controller 142 of the first application server 140. The memory access request includes an address 116. The selection unit 130 of the access unit 100 includes third and fourth queues 132-1 and 132-2, which may each receive an output of the first and second queues 112-1 and 112-2. The third and fourth queues 132-1 and 132-2 are to have separate paths to the NVRAM 150. The path unit 120 is to select which of the outputs of the first and second queues 112-1 and 112-2 is be received by each of the third and fourth queues 132-1 and 132-2 based on the address 116 from the memory access request 114. Here, the request 114 is shown to be received by the first queue 112-1. The path unit 120 then reads the address 116 of the request 114 and outputs control data to the selection unit 130 that causes the request 114' to be routed to the fourth queue 132-2 for transmission to the NVRAM 150. The path unit and selection units 120 and 130 are explained in greater detail below with respect to FIG. 2.

While the buffer and selection units 110 and 130 are shown to each include two queues, embodiments of the buffer and selection units 110 and 130 may include more or less than two queues. As explained above, the first application server 140 is redundantly connected to the access unit 100 and the access unit 100 is redundantly connected to the NVRAM 150, to provide adequate fault tolerance. Further, the path unit 120 selects a path between one of the first and second queues 112-1 and 112-2 and one of the third and fourth queues 132-1 and 132-2 at memory access speeds, thus reducing latency.

Figure 2:
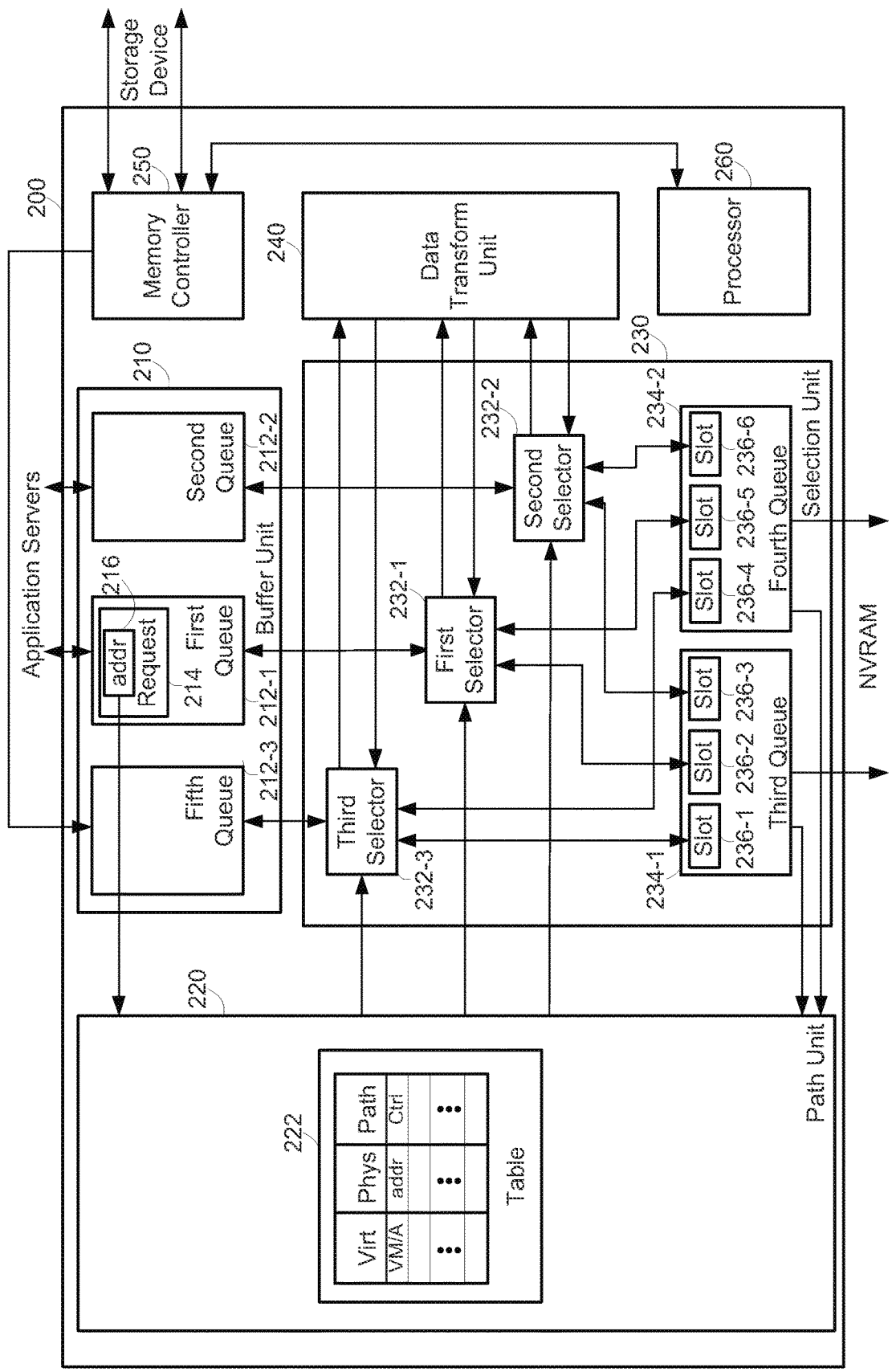
FIG. 2 is another example block diagram of an access unit.

FIG. 2 is another example block diagram of an access unit 200. The access unit 200 of FIG. 2 may include at least the functionality and/or hardware of the access u it 100 of FIG. 1. For instance, a buffer unit 210, path unit 220 and selection unit 230 included in the access unit 200 of FIG. 2 may respectively include the functionality of the buffer unit 110, path unit 120 and selection unit 130 included in the access unit 100 of FIG. 1. Further, the access unit 200 of FIG. 2 also includes a data transform unit 240, a memory controller 250 and a processor 260. While FIG. 2 shows the memory controller 250 to be external to the processor 260, embodiments may also include the memory controller 250 being internal to the processor 260.

The data transform unit 240 may include, for example, a hardware device including electronic circuitry for implementing the functionality described below, such as control logic and/or memory. In addition or as an alternative, the data transform unit 240 may be implemented as a series of instructions or microcode encoded on a machine-readable storage medium and executable by a processor.

The memory controller 250 of FIG. 2 may be any type of device that manages a flow of data going to and from one or more memories, such as a cache (not shown) of the processor 260, an internal memory like RAM (not shown) of the access unit 200, external memory like a block storage device (not shown) interfacing with the access unit 200 via PCI, SAS and/or SCSI protocols, and the like. The processor 260 may be, at least one cent al processing unit (CPU), at least one semiconductor-based microprocessor, at least one graphics processing unit (GPU), or other hardware devices suitable for retrieval and execution of instructions, such as instructions of the access unit 200.

In FIG. 2, the buffer unit 210 is shown to include a first queue 212-1, second queue 212-2 and a fifth queue 212-3. The path unit 220 is shown to include a table 222. Further, the selection unit 230 is shown to include a first selector 232-1, a second selector 232-2, a third selector 232-3, a third queue 234-1 and a fourth queue 234-2. The selectors 232-1 to 232-3 may be any type of device to select one or more inputs to forward along one or more paths in response to a control signal, which may include control data. In addition, ports (not shown) of the access unit 200 may interface with the first through fifth queues 212-1 to, 212-3 and 234-1 to 234-2, to facilitate receiving or transmitting data between the application server 140, the NVRAM 150, the storage device 150 and/or an internal memory of the access unit 200. The first through fifth queues 212-1 to 212-3 and 234-1 to 234-2 may include hardware for storing instructions and/or data, such as buffers. In one instance, the first through fifth queues 212-1 to 212-3 and 234-1 to 234-2 may be FIFO queues holding 8 or more requests at a time.

The first and second queues 212-1 and 212-2 of the buffer unit 210 may receive requests from one or more application servers (not shown), such as memory controllers of first and second application servers. The fifth queue 212-3 may interface with the memory controller 250 of the access unit 200 and forward a memory access request from at least one of the processor 260 of the access unit 260 and a block storage device (not shown). For instance, the memory controller 250 may have direct memory access (DMA) via a Peripheral Controller Interface (PCI) with the block storage device. The path unit 220 reads an address 216 included in a request 214 received by the buffer unit 210, such as at the first queue 212-1. The table 222 included in the path unit 230 has a virtual address column, a physical address column and a path column. The table 222 may be, for example, a hash table, B-tree, content addressable memory, and the like.

Entries of the virtual address column are to store addresses of a plurality of memory access requests, such as the address 216 of the request 214. When a system includes a plurality of application servers, the memory access request 216 may also include an application server identity. The path unit 220 may use the application server identity to distinguish between virtual addresses of at least one of different domains and servers.

Entries of the physical address column are to store physical addresses of the NVRAM 150 and entries of the path column are to store control data for selecting a path for at least one of the plurality of memory access requests. The physical address may include a reference to a component, such as the NVRAM 150, and an offset into a memory space designated by the reference. At least one of the entries of the virtual address column is associated with one of the entries of the physical address column and one of the entries of the path column.

The first selector 232-1 may forward the output of the first queue 212-1 to one of the third and fourth queues 234-1 and 234-2 based on the control data of the path column associated with an address of one of a plurality of memory access requests included in the first queue 212-1. For example, the path unit 220 may match an address of the table 222 with the address 216 included in the request 214 of the first queue 212. Next, the path unit 220 may transmit to the first selector 232-1 the control data stored in the path column and associated with the matching address. The path unit 220 may also transmit to the first selector 232-1 the physical address of the NVRAM 150 stored in the physical address column and associated with the matching address, in order to supplement the request 214 with a correct destination location within the NVRAM 150.

The second selector 232-2 may forward the output of the second queue 212-2 to one of the third and fourth queues 234-1 and 234-2 based on the control data of the path column associated with an address of another of the plurality of memory access requests included in the second queue 212-2. The third selector 232-3 is to forward the output of the fifth queue 212-3 to one of the third and fourth queues 234-1 and 234-2 based on the control data associated with the address of the memory access request included in the fifth queue 212-3.

The data transform unit is 240 to perform an operation on data associated with the memory access request 214. At least one of the first, second, third, fourth and fifth queues 212-1 to 212-3 and 234-1 and 234-2 is to store the data associated with the memory access request 214. The first, second and third selectors 232-1 to 232-3 are to at least one of output to and receive data from the data transform unit 240 based on the control data. The control data of the path column may indicate a type of data transformation based on the associated address of the virtual address column. Examples of type of data transformation may include techniques to compress, encrypt, and perform RAID computations on the data. Moreover, the data transform unit 250 may include queues (not shown) to receive data from and output data to the first to third selectors 232-1 to 232-3.

The data transform unit 240 may operate on the data before the data is transmitted to the NVRAM 150, if the data is associated with a write request. Furthermore, the data transform unit 140 may also operate on the data after data is received from the NVRAM 150, if the data is associated with a read request. The path unit 220 may add a new entry to the table 22 in response to a map command from the memory controller 250 of the first application server 140. The term mapping may refer to a technique for incorporating one or more memory addresses of a device, such as the NVRAM 150, into an address table of another device, such as the table 222 of the access unit 200. The first application server 140 may submit the map command to create a virtualized memory, as explained above with respect to FIG. 1.

In some examples, the first application server 230-1 may carry out a synchronize operation, such as to ensure atomicity, consistency, isolation, or durability (ACID). For example, synchronizing the data may enable data or transaction recovery after power loss or insure that modification to related groups of data are visible in their entirety to all subsequent consumers of the data.

For example, the path unit 220 may flush any data related to a synch command and stored at the first through fifth queues 212-1 to 212-3 and 234-1 and 234-2 in response to the sync command from the first application server 150. For instance, the path unit 220 may determine a path to flush the data through at least one of the first through fifth queues 212-1 to 212-3 and 234-1 and 234-2 based on which of the first and second queues 212-1 and 212-2 receives the synch command and an address included in the sync command. The path unit 220 may include or exclude use of the processor 260 of the access unit 200 for the synchronization based on the path. The processor 260 of the access unit 200 may record information related to the synchronization, such as logs or metadata, if the processor 260 is included in the synchronization. However, the processor 260 may be free to carry out other operations, if it is not involved in the synchronization.

As shown in FIG. 2, each of the third and fourth queues 234-1 and 234-2 includes a plurality of slots 236-1 to 236-6 to receive requests. The output of the first queue 212-1 is allocated to one of the slots 236 in each of the third and fourth queues 234-1 and 234-2 and the output of the second queue 212-2 allocated to an other of the slots 236 in each of the third and fourth queues 234-1 and 234-2. Similarly, the output of the fifth queue 212-3 is allocated to one of the slots 236 in each of the third and fourth queues 234-1 and 234-2. Thus, each of the third and fourth queues 234-1 and 234-2 may select from any of the first, second and fifth queues 212-1 to 212-3 to output to the NVRAM, via the slots 236-1 to 236-6, assuming the path unit 220 directs the selectors 232-1 to 232-3 to forward the corresponding outputs.

The third and fourth queues 234-1 and 234-2 may each determine from which of the plurality of slots 236-1 to 236-6 to output based on, for example, a round robin mechanism and/or a priority of the request 214. For instance, the third queue 234-1 may divide the output between its three slots 236-1 to 236-3 based on time increments, with two times slices given to the application server paths (the second and third slots 236-2 and 236-3) for every time slice given to the internal path (the first slot 236-1).

The path unit 220 may determine if the memory access request 214 to the NVRAM via one of the third and fourth queues 234-1 and 234-2 fails. For instance, the third and/or fourth queues 234-1 and 23402 may notify the path unit 220 if an attempt to access the physical address of the NVRAM indicated by the table 222 may not be able to be completed. In turn, the path unit 220 may modify a path of the memory request 214 through the access unit 200 to travel along the other of the third and fourth queues 234-1 and 234-2 (e.g. the non-failing path).

Alternatively or in addition, the path unit 220 may seek to access the NVRAM again at a different location that redundantly stores the data, assuming the NVRAM stores data redundantly. The above failover operations may be carried out without the application server requesting memory access again, thus helping to reduce latency and mask any memory issues or errors from the application server. The term fail over may refer to an automatic switching to a redundant or standby computer server, system, hardware component or network upon the failure or abnormal termination of the previously active application, server, system, hardware component or network.

While FIG. 2 shows the first queue 212-1 receiving the request 216, embodiments may include the buffer unit 210 having more or less than three queues with any of the queues to receive requests from one or more different sources. Similarly, the selection unit 230 may also include more or less than two queues interfacing with one or more different memories and more or less than three selectors.

Figure 3:
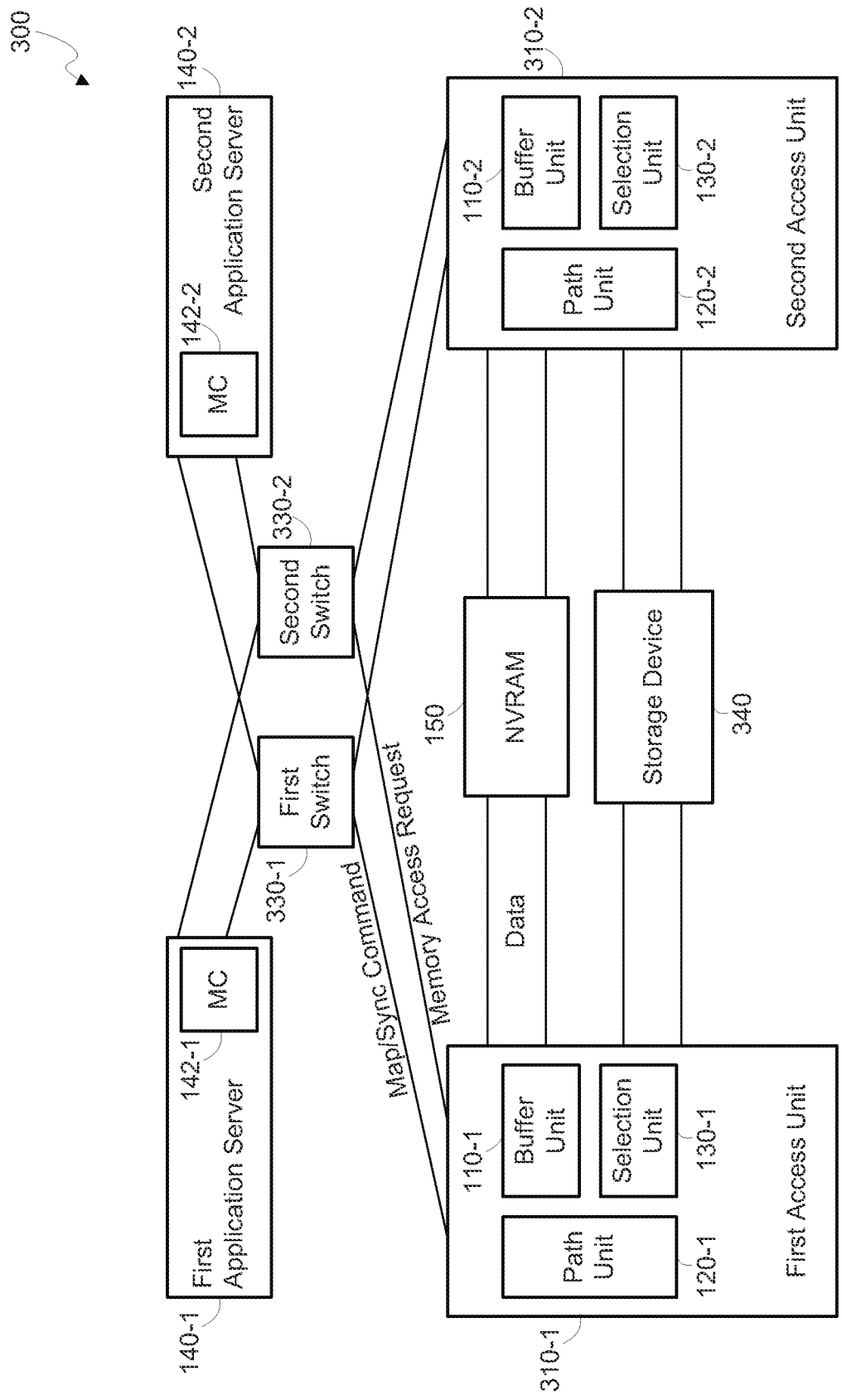
FIG. 3 is an example block diagram of a system including the access unit of FIG. 1

FIG. 3 is an example block diagram of a system 300 including the access unit 100 of FIG. 1. However, the system 300 may also include other embodiments of the access unit 100, such as the access unit 200 of FIG. 2. In FIG. 3, the system 300 includes the NVRAM 150, a first access unit 310-1, a second access unit 310-2, a first application server 140-1, a second application server 140-2, a first switch 330-1, a second switch 330-2 and a storage device 340. The NVRAM 150 of FIG. 3 may include similar functionality and/or hardware to the NVRAM 150 of FIG. 1.

The first and second application servers 140-1 and 140-2 of FIG. 3 may include similar functionality and/or hardware to the first application server 140 of FIG. 1. For instance, the first and second application servers 140-1 and 140-2 are each shown to include a memory controller (MC) 142-1 and 142-2. Further, the first and second access units 310-1 and 310-2 of FIG. 3 may include similar functionality and/or hardware to the access unit 100 of FIG. 1 and/or access unit 200 of FIG. 2. For instance, the first and second access units 310-1 and 310-2 are each shown to include buffer units 110-1 and 110-2, path units 120-1 and 120-2 and selection units 130-1 and 130-2. Also, any operations of the first application server 140-1 and the first access unit 310-1 may respectively be performed by the second application server 140-2 and the second access unit 310-2.

In FIG. 3, the first switch 330-1 connects to the first application server 140-1, the second application server 140-2, the first access unit 310-1 and the second access unit 310-2. The second switch 330-2 connects to the first application server 140-1, the second application server 140-2, the first access unit 310-1 and the second access unit 310-2. Thus, the switches 330-1 and 330-1 redundantly connect the first and second application servers 140-1 and 140-2 to the access units 310-1 and 310-2. The first and second switches 330-1 and 330-2 may be any type of device that links network segments or network devices.

The first and second access units 310-1 and 310-2 are each redundantly connected to the NVRAM 150 and the storage device 340. The storage device 340 may be any electronic, magnetic, optical, or other physical storage device, such as a hard disk drive (HDD), solid-state drive (SSD) and the like. Further, there is no direct path between the application servers 140-1 and 140-2 and the NVRAM 150. Instead, all paths to the NVRAM 150 are via at least one of the plurality of access units 310-1 and 310-2.

While FIG. 3 shows the NVRAM 150 to be external to the access units 310-1 and 310-2, embodiments may also include the NVRAM 150 being internal to the access units 310-1 and 320-2. For example, the NVRAM 210 may include first and second memory devices (not shown), where both of the memory devices include NVRAM. The memory devices may define a structure, such as a redundant array of independent disks (RAID), and/or storage mechanisms such as separate SSDs and the like. One of the memory devices may be included in the first access unit 310-1 and an other of the memory devices may be included in the second access unit 310-2. Each of the access units 310-1 and 31-2 may have a direct first link (not shown) to its respective internal memory device and an indirect second link to the other access unit 310-1 and 310-2 in order to access the other memory device.

The block storage device 340 may also have a similar pair of redundant devices, such as a pair of disk drives. Embodiments may include more or less than two drives and/or memory devices. While FIG. 3 shows two switches 330-1 and 330-2 for forwarding data, embodiments may include any type and/or number of network devices capable of processing, routing and/or forwarding data, such as a router, gateway, hub and the like. Furthermore, embodiments may include more or less application servers 140, access units 310, switches 330, storage devices 340, and the like than that shown in FIG. 3.

Figure 4:
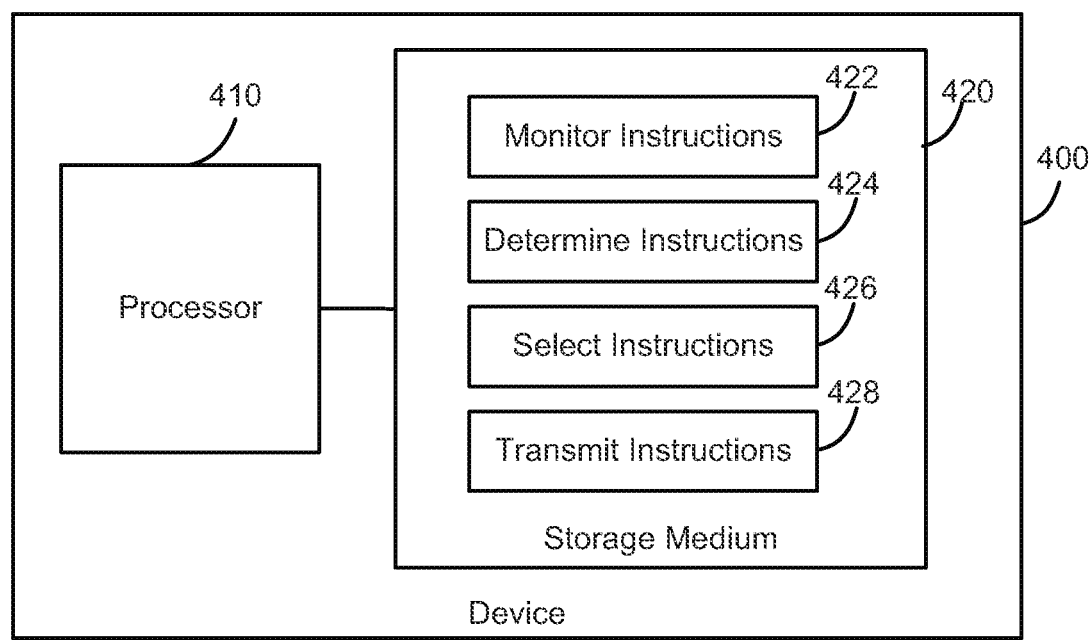
FIG. 4 is an example block diagram of a computing device including instructions for selecting a path between an NVRAM and an application server.

FIG. 4 is an example block diagram of a computing device 400 including instructions for selecting a path between an NVRAM and an application server. In the embodiment of FIG. 4, the computing device 400 includes a processor 410 and a machine-readable storage medium 420. The machine-readable storage medium 420 further includes instructions 422, 424, 426 and 428 for selecting a path between an NVRAM (not shown) and an application server (not shown).

The computing device 400 may be, for example, a secure microprocessor, a notebook computer, a desktop computer, an all-in-one system, a server, a network device, a controller, a wireless device, or any other type of device capable of executing the instructions 422, 424, 426 and 428. In certain examples, the computing device 400 may include or be connected to additional components such as memories, controllers, etc.

The processor 410 may be, at least one central processing unit (CPU), at least one semiconductor-based microprocessor, at least one graphics processing unit (GPU), a microcontroller, special purpose logic hardware controlled by microcode or other hardware devices suitable for retrieval and execution of instructions stored in the machine-readable storage medium 420, or combinations thereof. The processor 410 may fetch, decode, and execute instructions 422, 424, 426 and 428 to implement selecting the path between the NVRAM and the application server. As an alternative or in addition to retrieving and executing instructions, the processor 410 may include at least one integrated circuit (IC), other control logic, other electronic circuits, or combinations thereof that include a number of electronic components for performing the functionality of instructions 422, 424, 426 and 428.

The machine-readable storage medium 420 may be any electronic, magnetic, optical, or other physical storage device that contains or stores executable instructions. Thus, the machine-readable storage medium 420 may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium 420 can be non-transitory. As described in detail below, machine-readable storage medium 420 may be encoded with a series of executable instructions for selecting the path between the NVRAM and the application server.

Moreover, the instructions 422, 424, 426 and 428 when executed by a processor (e.g., via one processing element or multiple processing elements of the processor) can cause the processor to perform processes, such as, the process of FIG. 4. For example, the monitor instructions 422 may be executed by the processor 410 to monitor a plurality of incoming queues (not shown) for a memory access request from at least one of a plurality of memory controllers (not shown) of a plurality of application servers.

The determine instructions 424 may be executed by the processor 410 to determine a physical address of the NVRAM and a control value associated with an address included in the memory access request, if the memory request is received at one of the plurality of incoming queues. The select instructions 426 may be executed by the processor 410 to select one of a plurality of paths between the incoming queue including the memory access request and a plurality of outgoing queues (not shown) to the NVRAM based on the associated control value. The transmit data instructions 428 may be executed by the processor 410 to transmit data between the at least one memory controller of the application server and the physical address of the NVRAM along the selected path.

Figure 5:
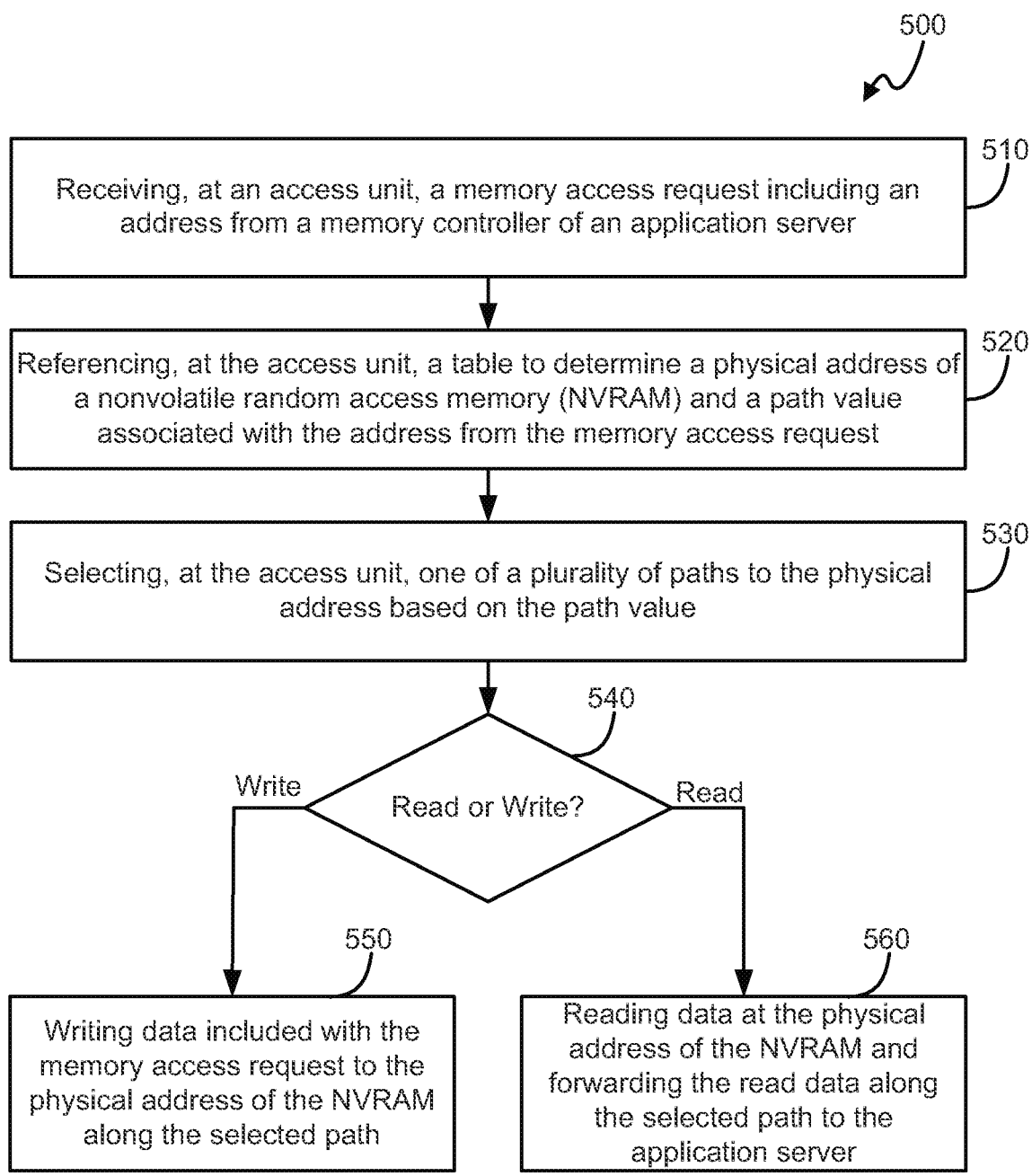
FIG. 5 is an example flowchart of a method for selecting a path between an NVRAM and an application server.

FIG. 5 is an example flowchart of a method 500 for selecting a path between an NVRAM and an application server. Although execution of the method 500 is described below with reference to the access unit 110, other suitable components for execution of the method 500 can be utilized, such as the access unit 200. Additionally, the components for executing the method 500 may be spread among multiple devices (e.g., a processing device in communication with input and output devices). In certain scenarios, multiple devices acting in coordination can be considered a single device to perform the method 500. The method 500 may be implemented in the form of executable instructions stored on a machine-readable storage medium, such as storage medium 420, and/or in the form of electronic circuitry.

At block 510, the access unit 100 receives a memory access request 114 including an address 116 from a memory controller 142 of an application server 140. Then, at block 520, the access unit 110 references a table 222 to determine a physical address of a nonvolatile random access memory (NVRAM) 150 and a path value associated with the address 116 from the memory access request 114. Next, at block 530, the access unit 100 selects one of a plurality of paths to the physical address based on the path value and flows to block 540 to determine whether the memory access request relates to a read or write request.

If the memory access request relates to a write request, the access unit 100 writes data included with the memory access request to the physical address of the NVRAM 150 along the selected path, at block 550. On the other hand, if the memory access relates to a read request, the access unit 100 reads data at the physical address of the NVRAM 150 and forwards the read data along the selected path to the application server 140, at block 560. All paths to the NVRAM 150 are via the access unit 100. Further, the above receiving, referencing, selecting and forwarding operations at blocks 510 to 560 are performed independently of a main processor of the access unit 100.

According to the foregoing, embodiments provide a method and/or device selecting a path from an application server to an NVRAM at memory access speeds, while still isolating server connectivity from storage hierarchy connectivity to assure adequate fault tolerance. Further, if the selected path fails, an alternate path may be selected at memory access speeds and without requiring the application server to retry accessing the NVRAM. Thus, embodiments may assure low latency communication between application servers and NVRAM while not compromising fault tolerance.

I claim:

1. An access device, comprising:
a processor;
a buffer including a plurality of queues, a given queue of the plurality of queues to receive a memory access request from a memory controller of a first application server, the memory access request including a virtual address;
output queues to each receive outputs of the plurality of queues, the output queues to have separate paths to a nonvolatile random-access memory (NVRAM), wherein the plurality of queues have a plurality of paths to the output queues; and
a non-transitory storage medium storing instructions executable on the processor to:
access mapping information using the virtual address in the memory access request, the mapping information comprising a plurality of entries, each entry of the plurality of entries mapping a respective virtual address to a corresponding physical address of the NVRAM and a corresponding control value that selects a path of the plurality of paths,
retrieve, from a selected entry of the plurality of entries in the mapping information, a control value based on the virtual address in the memory access request,
select, based on the retrieved control value, a selected path of multiple paths between the given queue and the output queues, the multiple paths being part of the plurality of paths, and
route the memory access request from the given memory queue along the selected path to an output queue of the output queues.

2. The access device of claim 1, wherein:
the mapping information includes a table having a virtual address column, a physical address column, and a path column,
entries of the virtual address column are to store virtual addresses of a plurality of memory access requests, entries of the physical address column are to store physical addresses of the NVRAM, and entries of the path column are to store control values that select respective paths of the plurality of paths.

3. The access device of claim 1, further comprising:
a first selector to:
forward the output of a first queue of the plurality of queues to a first of the output queues in response to the selected entry having a first control value, and
forward the output of the first queue to a second of the output queues in response to the selected entry having a different second control value.

4. The access device of claim 3, further comprising:
a second selector to forward the output of a second queue of the plurality of queues to one of the output queues based on a control value of an entry of the mapping information.

5. A system, comprising:
a plurality of the access devices according to claim 1;
the first application server and a second application server, the second application server including a second memory controller;
the NVRAM; and
a plurality of switches to redundantly connect the first and second application servers to the plurality of access devices.

6. The access device of claim 1, wherein the instructions are executable on the processor to:
determine whether the memory access request to the NVRAM via one of the output queues fails, and in response to determining that the memory access request to the NVRAM via the one of the output queues fails, perform at least one of:
   accessing the NVRAM again at a different location that redundantly stores data for the memory access request, or
   modifying a path of the memory access request through the access device to travel to another of the output queues, without the first application server requesting memory access again.

7. The access device of claim 1, further comprising:
a data transformer to perform an operation on data associated with the memory access request, wherein the control value of the selected entry indicates a type of data transformation performed by the data transformer.

8. The access device of claim 7, wherein:
the data transformer is to operate on the data before the data is transmitted to the NVRAM, in response to the memory access request being a write request, and
the data transformer is to operate on the data after data is received from the NVRAM, in response to the memory access request being a read request.

9. The access device of claim 1, wherein the instructions are executable on the processor to:
add a new entry to the mapping information in response to a map command from the memory controller of the first application server, and
flush any data related to a synchronization command and stored at the plurality of queues and the output queues in response to the synchronization command from the first application server.

10. The access device of claim 9, wherein the instructions are executable on the processor to:
determine a path to flush the data through at least one of the plurality of queues and the output queues based on which of the plurality of queues and the output queues receives the synchronization command and an address included in the synchronization command.

11. The access device of claim 1, wherein:
at least one of the plurality of queues is to receive a memory access request including an address from a memory controller of a second application server, and
the memory access request from the memory controller of the second application server includes an application server identity, and
the instructions are executable on the processor to use the application server identity to distinguish between virtual addresses of at least one of different domains and servers.

12. The access device of claim 1, wherein,
each of the output queues include a plurality of slots to receive requests, the output of a first queue of the plurality of queues is allocated to one of the slots in each of the output queues, and the output of a second queue of the plurality of queues is allocated to another of the slots in each of the output queues, and
the output queues are to each determine from which of the plurality of slots to output based on at least one a round robin mechanism and a priority of a request of the requests.

13. A method, comprising:
receiving, at an access device, a first memory access request including a virtual address from a memory controller of an application server;
referencing, at the access device, a table to determine a physical address of a nonvolatile random access memory (NVRAM) and a path value associated with the virtual address in the first memory access request, wherein the table maps the virtual address to the physical address and the path value;
selecting, at the access device, a selected path of a plurality of paths to the physical address based on the path value, the access device including a first incoming queue, a second incoming queue, and a plurality of outgoing queues that have separate paths to the NVRAM, and the plurality of paths including paths between the first incoming queue and the plurality of outgoing queues, and paths between the second incoming queue and the plurality of outgoing queues, the first and second incoming queues to receive memory access requests from the memory controller, and the first memory access request received at the first incoming queue;
routing the first memory access request from the first incoming queue along the selected path to a given outgoing queue of the plurality of outgoing queues;
writing data of the first memory access request to the physical address of the NVRAM along the selected path between the first incoming queue and the given outgoing queue, in response to the first memory access request relating to a write request; and
reading data at the physical address of the NVRAM and forwarding the read data along the selected path between the first incoming queue and the given outgoing queue to the application server, in response to the first memory access request relating to a read request.

14. The method of claim 13, wherein:
all paths from the memory controller to the NVRAM are via the access device, and
the receiving, the referencing, the selecting, the routing, the writing, and the reading are performed independently of a main processor of the access device.

15. The method of claim 13, further comprising:
in response to the first memory access request relating to the write request, performing, by a data transformer, a transformation of the data of the first memory access request, a type of the transformation indicated by the path value.

16. The method of claim 15, wherein the transformation is selected, based on the path value, from a plurality of different types of transformations.

17. The method of claim 16, wherein the plurality of different types of transformations include data compression, data encryption, and a RAID computation.

18. A non-transitory computer-readable storage medium storing instructions that upon execution cause a device to:
monitor a plurality of incoming queues in the device for a memory access request including a first virtual address received in a first incoming queue from a memory controller, the device connected between the memory controller and a nonvolatile random access memory (NVRAM), the device separate from the memory controller and the NVRAM;
access mapping information using the first virtual address in the memory access request, the mapping information comprising a plurality of entries, each entry of the plurality of entries mapping a respective virtual address to a corresponding physical address of the NVRAM and a corresponding control value that selects a path of a plurality of paths between the incoming queues and a plurality of outgoing queues in the device;
determine, based on a selected entry of the mapping information corresponding to the first virtual address, a physical address of the NVRAM and a control value associated with the first virtual address in the memory access request;

select a selected path of multiple paths between the first incoming queue and the plurality of outgoing queues to the NVRAM based on the control value in the selected entry, the plurality of outgoing queues in the device having separate paths to the NVRAM; and route the memory access request from the first incoming queue along the selected path to an outgoing queue of the plurality of outgoing queues.

19. The non-transitory computer-readable storage medium of claim 18, wherein the multiple paths between the first incoming queue and the plurality of outgoing queues comprise a first path between the first incoming queue and a first outgoing queue of the plurality of outgoing queues, and a second path between the first incoming queue and a second outgoing queue of the plurality of outgoing queues, and wherein the selected path is one of the multiple paths including the first path and the second path.

20. The non-transitory computer-readable storage medium of claim 18, wherein the instructions upon execution cause the device to:

transmit data between the memory controller and the physical address of the NVRAM along the selected path.

* * * * *